(12) United States Patent
Yoshino et al.

(10) Patent No.: US 6,220,104 B1
(45) Date of Patent: Apr. 24, 2001

(54) JOINT TORQUE DETECTION SYSTEM

(75) Inventors: Ryutaro Yoshino; Hideaki Takahashi, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/059,299

(22) Filed: Apr. 14, 1998

(30) Foreign Application Priority Data

Apr. 15, 1997 (JP) .................................................. 9-113339

(51) Int. Cl.$^7$ ................................................ G01F 1/56
(52) U.S. Cl. ........................................................ 73/862.08
(58) Field of Search ................................ 73/862.08–399; 416/43

(56) References Cited

U.S. PATENT DOCUMENTS 4,348,154 * 9/1982 Ducker .................................... 416/43
6,012,538 * 1/2000 Sonobe et al. ......................... 180/220

OTHER PUBLICATIONS

"Multisensory Shared Autonomy and Tele–Sensor Programming–Key Issues in Space Robotics", Hirzinger, *Robotics and Autonomous Systems 11*, 1993, pp. 141–162.

* cited by examiner

*Primary Examiner*—Benjamin R. Fuller
*Assistant Examiner*—Jewel V. Thompson
(74) *Attorney, Agent, or Firm*—Arent Fox Kintner Plotkin & Kahn, PLLC

(57) ABSTRACT

A joint torque detection system having a plurality of post-like members disposed around an axis of a joint which connects two links. The plurality of post-like members deform or twist when a torque is imparted to one of the links. An electric motor is fixed at one of the links and the motor rotation is reduced by a harmonic-drive speed reducer fixed at the other of the links. The plurality of post-like members are annularly disposed around the joint axis such that they embrace the speed reducer. A gap sensor (displacement detector) is fixed to the second link, close to the speed reducer between the output of the speed reducer and the second link in such a manner that the sensor generates a signal indicative of relative displacement of the speed reducer output (connected to the one of the links) and the second link. With this arrangement, the system can be incorporated in a small link mechanism such as a robot finger link mechanism, with excellent detection accuracy and an elongated service life.

5 Claims, 8 Drawing Sheets

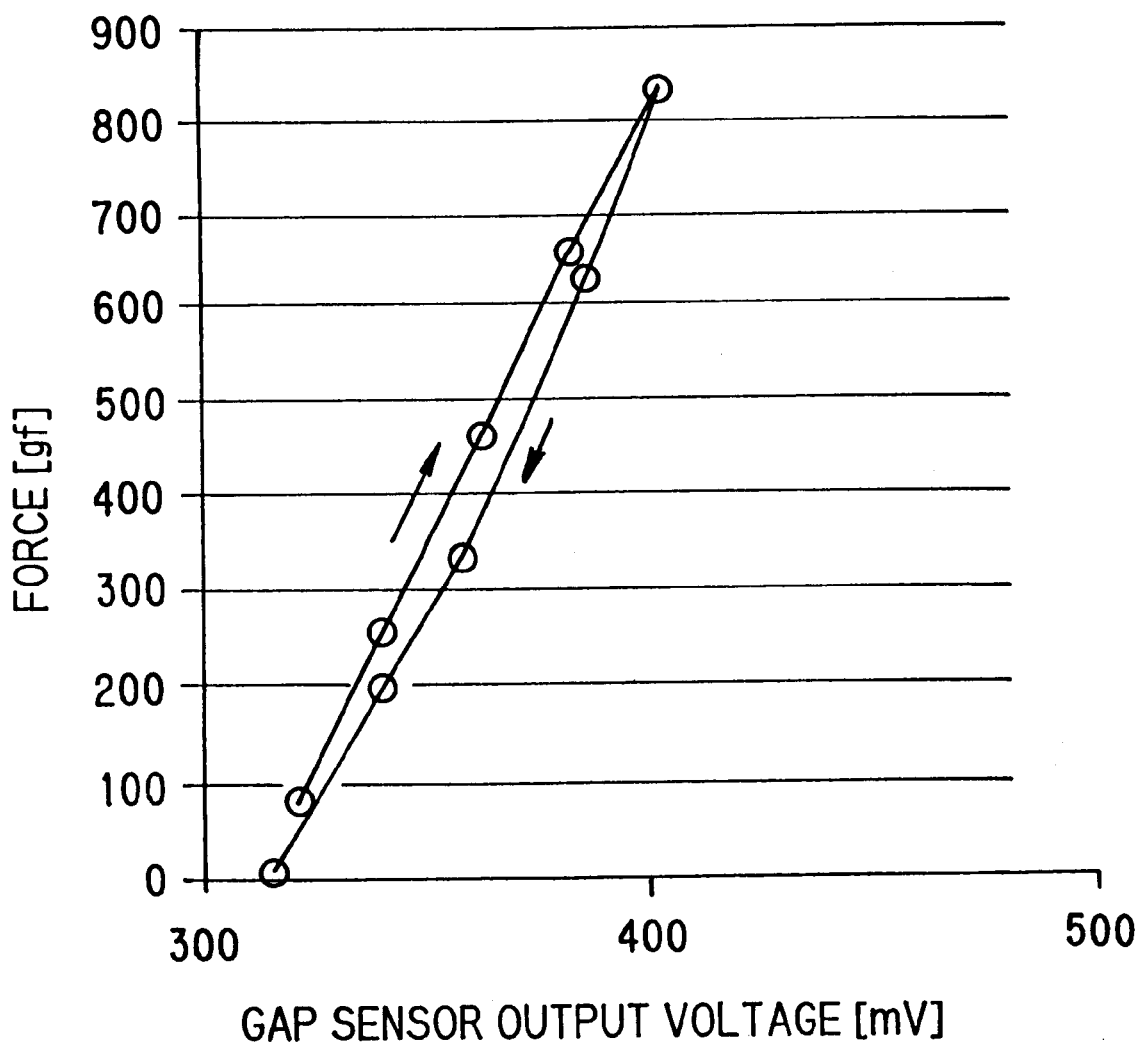

JOINT TORQUE DETECTION SYSTEM

BACKGROUND OF THE INVENTION

1. Field of the Invention

The present invention relates to a joint torque detection system, and more articularly to a joint torque detection system for detecting the joint torque exerted or imparted to a joint, for example, a robot joint.

2. Description of the Related Art

There have been proposed various joint torque detection systems for detecting the joint torque exerted or imparted to a joint, such as the one described in "Multisensory shared autonomy and tele-sensor programming—Key issues in space robotics"; pp 141–162; Robotics and autonomous Systems 11 (1993) 141–162, Elsevier. As illustrated in its FIG. 13, the detection system has a rotational gearing with inductive torque sensing for joints.

It has also been proposed to provide a six-axis force and torque sensor at the distal end of a joint such as a robot joint to detect an external force acting at a free end of the joint downstream of the sensor location so as to conduct a compliance control in order that the robot effects a smooth motion.

Since, however, the sensor, if attached at the distal end of a robot joint, can not measure an exerted force acting on a portion upstream of the sensor location, the sensor should preferably be provided in the joints to measure the torque exerting or acting on the joint, to control its motion.

When the robot joint is a robot arm which needs to work in a narrow space, the arm position should be controlled precisely such that it will not contact foreign objects such as walls. The trajectory (path) of the link distal end should accordingly be determined and controlled in an accurate manner. This is particularly significant for a robot hand, since it is an end-effector. For example, when taking an object from a narrow space or grasping an object using all of the finger links, the robot hand finger links may sometimes destroy the object or suffer from excessive load and be damaged, unless the external force (torque) is detected and a precise control is conducted based on the detected force (torque).

It is accordingly desirable to detect accurately the torque exerted or imparted to a small link mechanism such as a robot hand finger link mechanism in order that the compliance control of the link mechanism is conducted based on the detected torque.

It would be possible to affix a strain gauge on a deformable portion of a small link mechanism to determine the torque. This kind of sensor is disadvantageous in terms of service life. If a great stress acts on the deformable portion, the strain gauge will be excessively displaced and will eventually be broken. Furthermore, it becomes necessary to form such a deformable portion at the output shaft of an actuator (e.g., a DC motor) provided at the drive joint. The deformable portion is likely to project laterally, i.e., in the direction of the width of the links constituting the joint, which is disadvantageous if the links are configured to be positioned side by side like a robot hand finger link mechanism.

It would also be possible to detect the imparted torque by measuring the electric current supplied to the joint actuator. However, a link mechanism such as finger link mechanism is usually made small by increasing reduction gear ratio of a speed reducer, rendering accurate torque detection difficult due to the low efficiency of the speed reducer.

SUMMARY OF THE INVENTION

An object of the present invention is to provide a joint torque detection system which overcomes the disadvantages of the prior art and which can be incorporated in a small link mechanism such as a robot finger link mechanism without projecting laterally from the link, and which has an excellent detection accuracy and an elongated service life.

In order to achieve these objects, a joint torque detection system is provided for detecting a torque imparted to a joint having at least a first link and a second link connected to each other to be displaceable about an axis, comprising an actuator fixed to the first link which facilitates rotation, a plurality of post-like members disposed around the axis between the first link and the second link, to be deformable when a torque is imparted to one of the first and second links, and a sensor disposed at one of the first and the second links close to the other to generate a signal indicative of a relative displacement between the first and second links.

BRIEF DESCRIPTION OF THE DRAWINGS

These and other objects and advantages of the invention will be more apparent from the following description and drawings, in which:

FIG. 8 is a graph showing an output characteristic of the joint torque detection system relative to an applied force.

DETAILED DESCRIPTION OF THE PREFERRED EMBODIMENTS

The joint torque detection system will be explained with reference to the drawings accompanied therein. In the embodiment of the invention, the joint torque detection system is incorporated in a finger link mechanism of an arm of a biped mobile robot.

Figure 1:
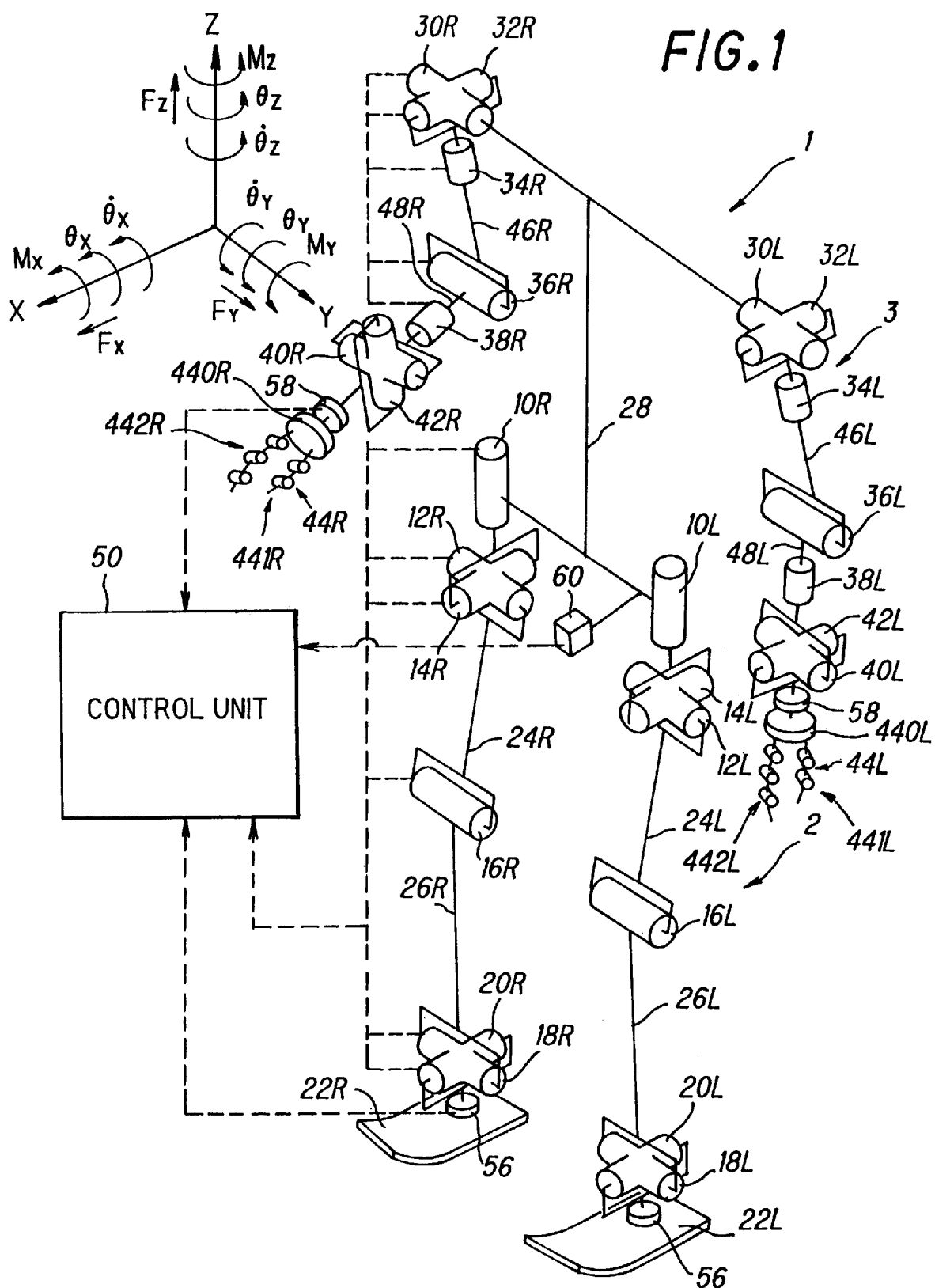
FIG. 1 is an overall schematic view showing a biped mobile robot in which a joint torque detection system according to the present invention is incorporated.

FIG. 1 is an overall schematic view showing the biped mobile robot. As illustrated in the figure, the robot 1 has a pair of laterally spaced articulated legs (leg links) 2 each composed of six joints. For an easier understanding, each of the joints is represented by an electric motor which actuates the joint.

The joints include, arranged successively downward, a pair of joints 10R, 10L (the right-hand joint is indicated by R and the left-hand joint by L) for rotating legs with respect to the hip, a pair of joints 14R, 14L for rolling movement with respect to the hip about an X-axis within a frontal plane, a pair of joints 12R, 12L for pitching movement with respect to the hip about a Y-axis within a sagittal plane, a pair of knee joints 16R, 16L for pitching movement with respect to knees, a pair of joints 18R, 18L for pitching movement with respect to ankle, and a pair of joints 20R, 20L for rolling movement with respect to ankle.

The joints 10R, 10L, 12R, 12L, 14R, 14L make up hip joints, and the joints 18R, 18L, 20R, 20L make up ankle joints. The hip joints and knee joints are connected to each other by thigh links 24R, 24L, and the knee joints and ankle joints are connected to each other by crus or shank links 26R, 26L.

The robot 1 has a body (diagrammatically shown by a T-shaped link) 28 above the hip joints and arm links 3 are connected to upper ends of the body link 28 corresponding to the shoulders. The arm links 3 have seven joints, respectively. For an easier understanding, each of the joints is similarly represented by an electric motor which actuates the joint.

The joints include, arranged successively downward, a pair of joints 30R, 30L for pitching movement of the arms with respect to the shoulders about an Y-axis, a pair of joints 32R, 32L for rolling movement of the arms with respect to the shoulders about a X-axis, a pair of joints 34R, 34L for rotating the arms with respect to the shoulders, a pair of elbow joints 36R, 36L for pitching movement with respect to elbows, a pair of joints 38R, 38L for rotating wrists with respect to the elbows, a pair of joints 40R, 40L for pitching movement of the wrists with respect to the elbows, and a pair of joints 42R, 42L for rolling movement of the wrists with respect to the elbows. The wrists are connected with the hands 44R, 44L.

The joints 30R, 30L, 32R, 32L, 34R, 32L make up shoulder joints, and the joints 38R, 38L, 40R, 40L, 42R, 42L make up wrist joints. The shoulder joints and elbow joints are connected to each other by upper arm links 46R, 46L, and the elbow joints and wrist joints are connected to each other by lower arm links 48R, 48L.

The body 28 houses therein a control unit 50 comprising microcomputers which will be described later with reference to FIG. 2.

With the above structure, each of the legs 2 is given six degrees of freedom. When the 6×2=12 joints are driven to suitable angles while the robot 1 is walking, a desired motion is imparted to the entire leg structure to cause the two-legged walking robot 1 to walk arbitrarily in a three-dimensional environment. In the specification, the direction in which the robot 1 walks is shown as an X-axis, the right and left directions perpendicular thereto as a Y-axis, and the direction of gravity as a Z-axis, as illustrated in the figure. Each of the arm links 3 is given 7 degrees of freedom. When the 7×2=14 joints are driven to suitable angles, the robot can thus effect a desired motion such as pushing a cart.

A known six-axis force and torque sensor 56 is disposed below each of the ankle joint 18, 20R(L) which generates a signal indicative of the three directional components Fx, Fy, Fz of a floor reaction force (among external forces) acting to the robot from the floor and three directional components Mx, My, Mz of torque or moment thereby. A similar six-axis force and torque sensor 58 is disposed at each of the hands 44R(L) which generates a signal indicative of the three directional components Fx, Fy, Fz of a reaction force acting on the robot from a working object and three directional components Mx, My, Mz of torque or moment thereby.

Moreover, the body 28 has an inclination sensor 60 which generates a signal indicative of a body tilt or inclination and its angular velocity in the frontal plane with respect to a Z-axis (the direction of gravity), and a body tilt or inclination and its angular velocity in the sagittal plane with respect to the Z-axis. The electric motors of the respective joints are coupled with respective rotary encoders which generate a signal indicative of the angular displacements (rotations) of the electric motors through speed reducers (gear ratio reduction mechanisms; not shown). Thus, the motors, the speed reducers and the rotary encoders constitute actuators with displacement detectors. The signals output from these sensors are sent to the control unit 50. The signal transmission to the control unit 50 is only shown for the right-hand joint in FIG. 1.

Each hand 44R(L) comprises a finger link mechanism attached to a base 440R(L), more specifically, it comprises a first, thumb-like, link mechanism 441R(L) having a first joint and a second joint and a second, index finger-like, link mechanism 442R(L) having a first joint, a second joint and a third joint. Although only one second link mechanism 442R(L) is shown, the robot hand 44R(L) has three more second link mechanisms.

Figure 2:
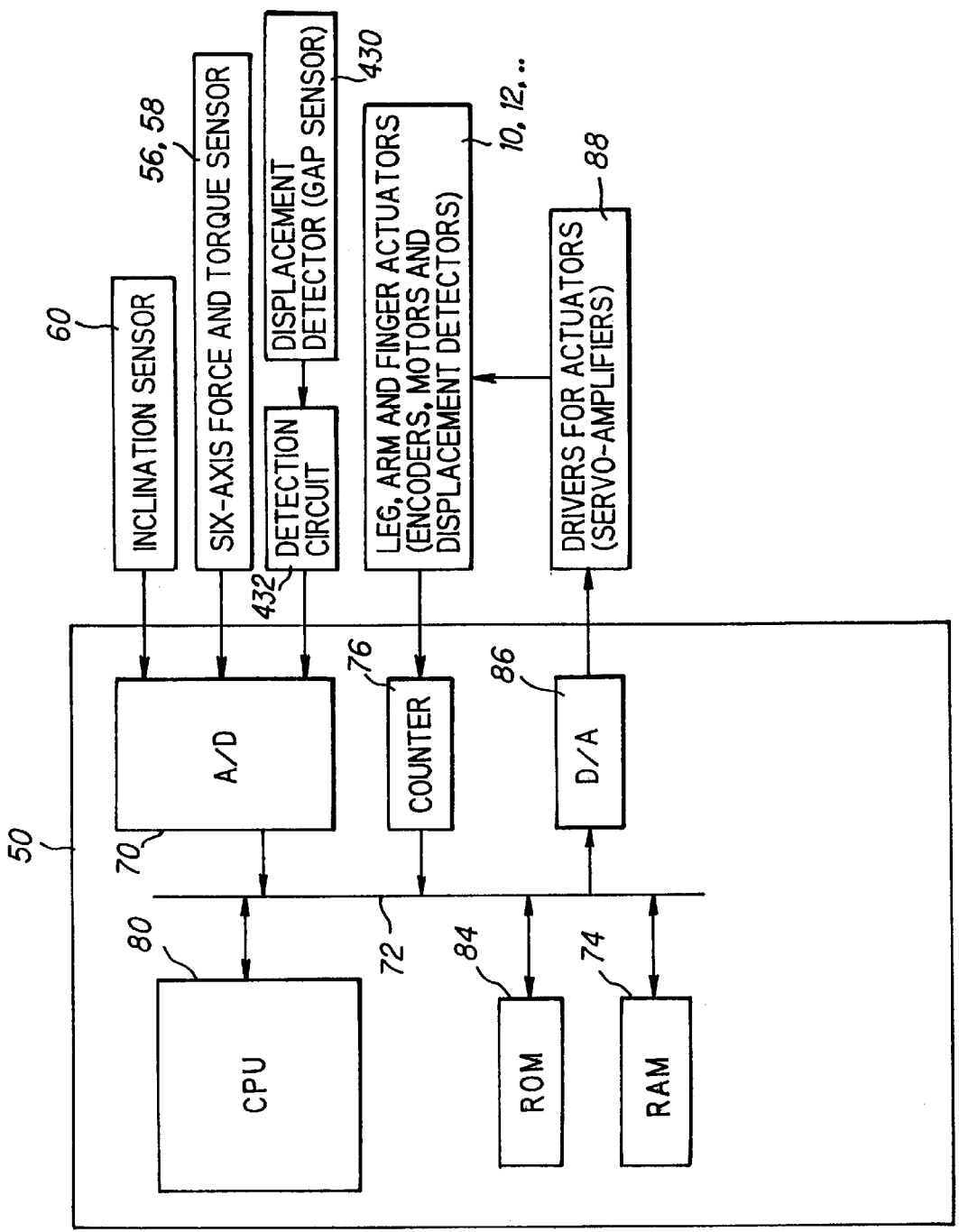
FIG. 2 is a block diagram showing the details of a control unit illustrated in FIG. 1.

FIG. 2 is a block diagram which shows the details of the control unit 50 comprised of a microcomputer. The signals output from the inclination sensor 60, etc., are converted by an A/D converter 70 into digital signals, which are transmitted through a bus 72 to a RAM 74. The signals output from the rotary encoders that are disposed adjacent to the respective electric motors in the individual actuators are supplied through a counter 76 to the RAM 74.

The control unit 26 includes a CPU 80. The CPU 80 determines desired joint angles (desired actuator displacement) in order that the robot can keep a stable posture based on gait parameters prepared and stored beforehand in a ROM 84, calculates joint angle commands from the difference between the desired joint angles and the detected joint angle., and sends the same through a D/A converter 86 and drivers (servo-amplifiers) 88 to the electric motors.

Figure 3:
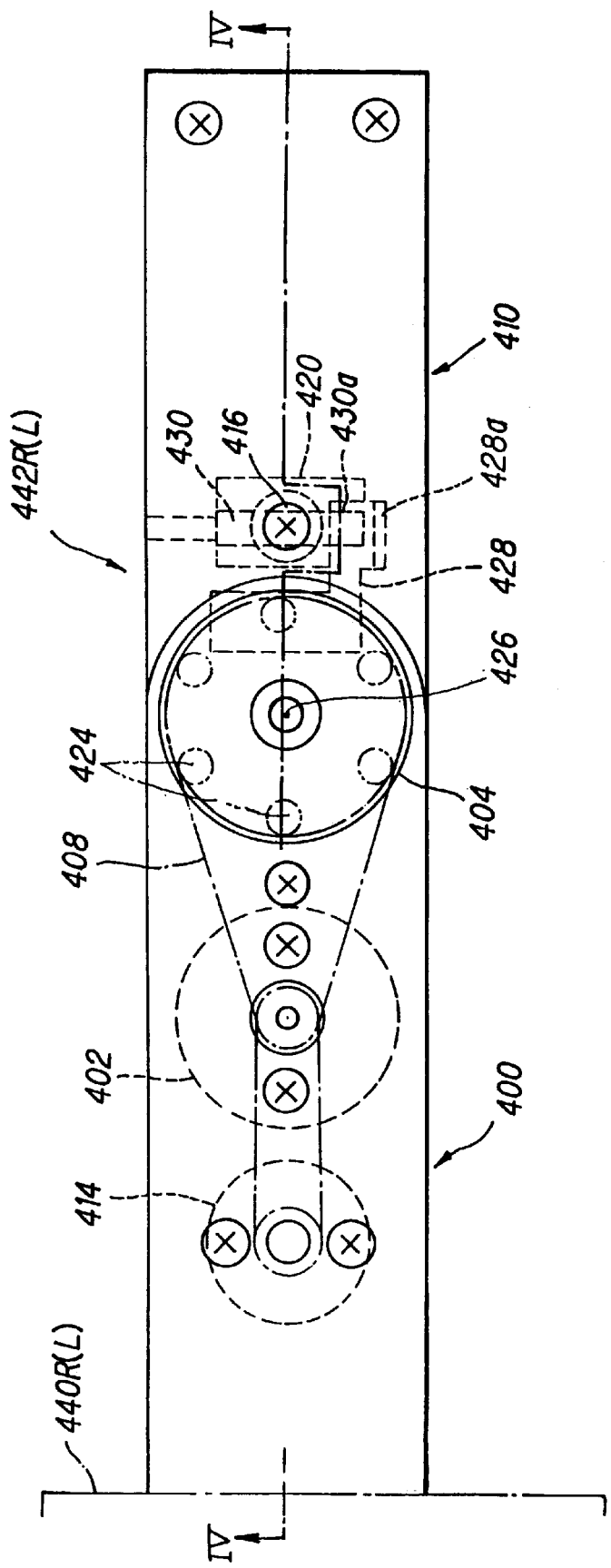
FIG. 3 is a plan view showing a first joint of a second finger link mechanism illustrated in FIG. 1.
Figure 4:
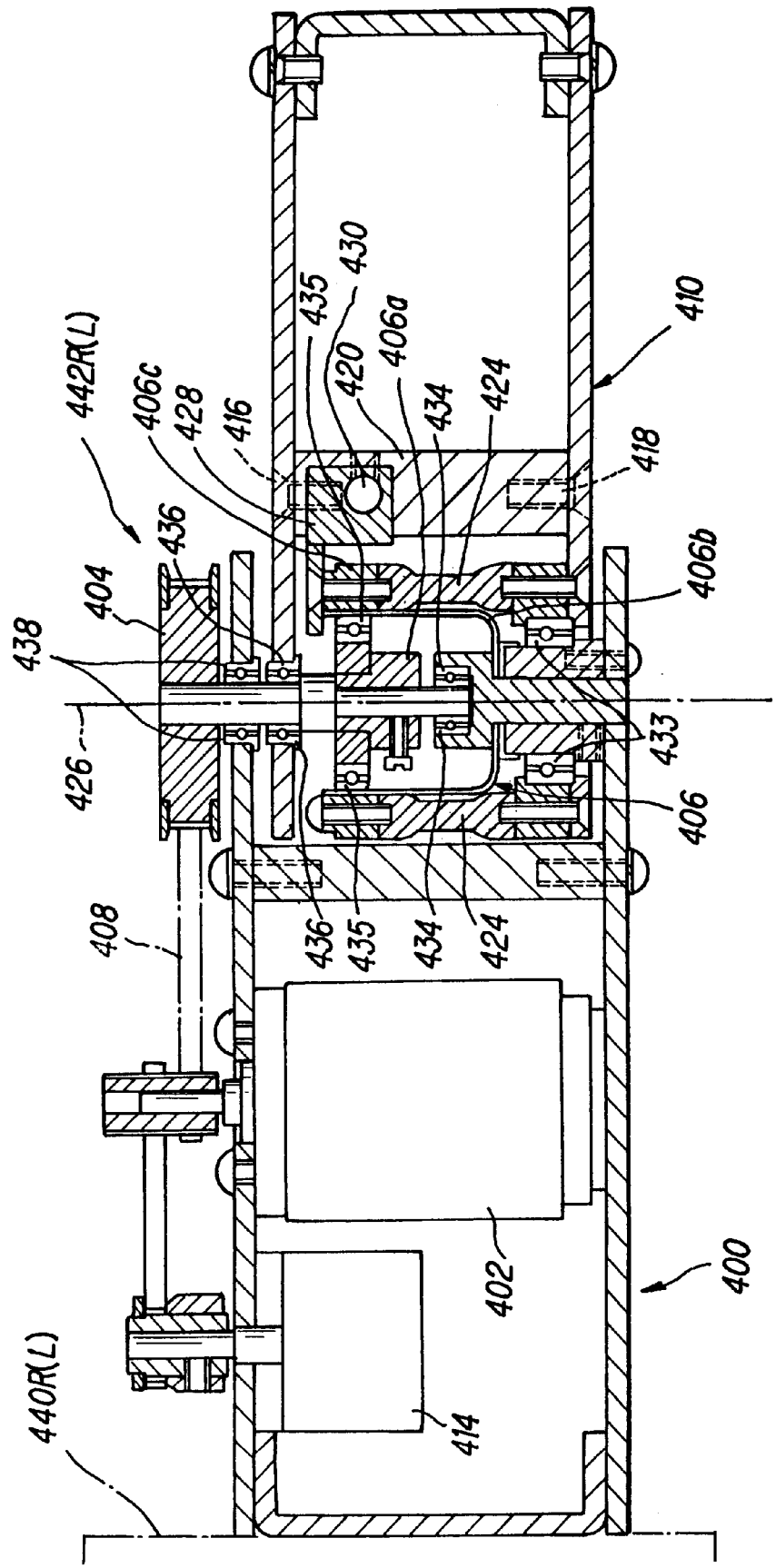
FIG. 4 is a cross-sectional view taken along line IV—IV of FIG. 3.
Figure 5:
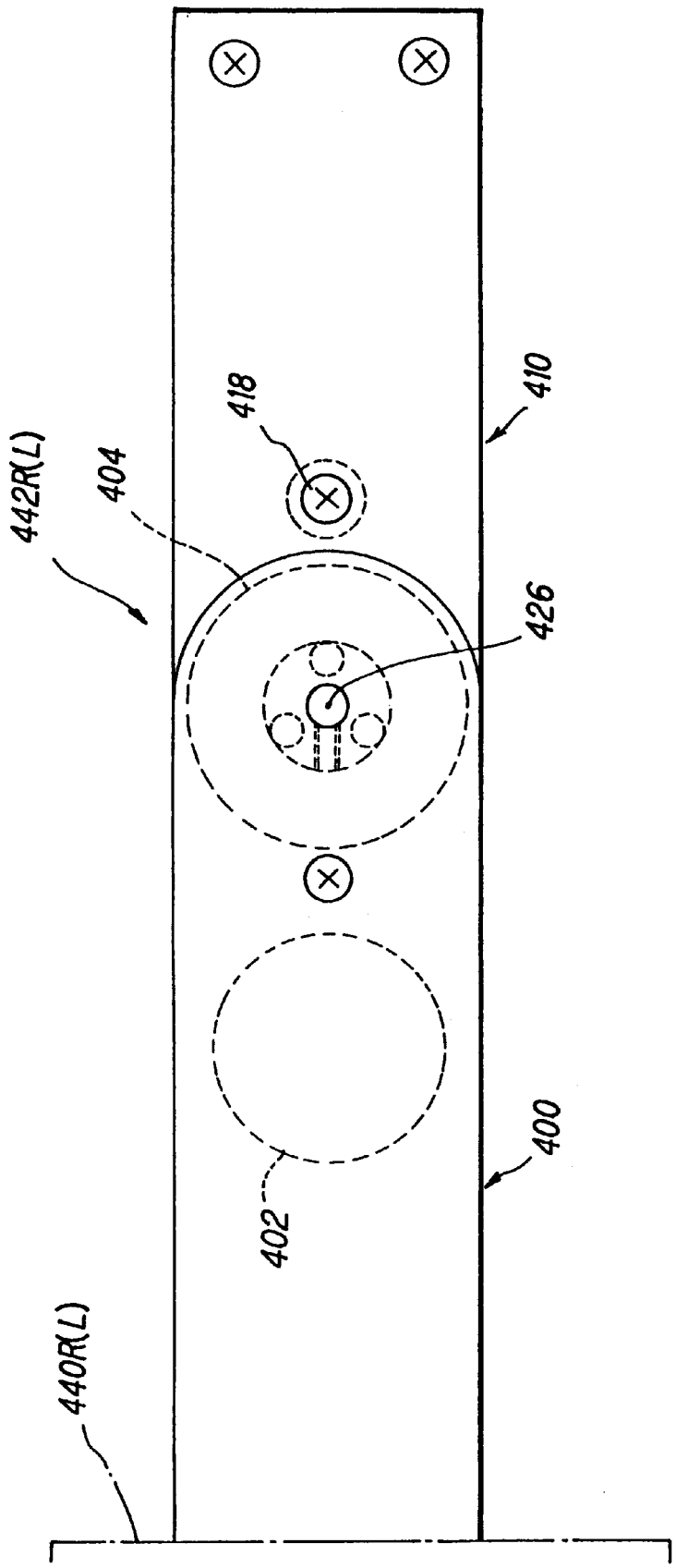
FIG. 5 is a bottom view of the first joint of the second finger link mechanism illustrated in FIG. 3.

FIG. 3 is a plan view showing the first joint of the second finger link mechanism 442R(L) of the first and second link mechanisms 441R(L), 442R(L) shown in FIG. 1, FIG. 4 is a cross-sectional view taken along line IV—IV of FIG. 3, and FIG. 5 is a bottom view of the mechanism shown in FIG. 3.

As illustrated, the second finger link mechanism 442R(L), made of iron or a similar material, has the base 440R(L) and a first link 400 connected to the base. The first link 400 houses an electric motor 402. A pulley 404 is rotatably mounted in the vicinity of the free end of the first link 400, and a well-known harmonic-drive speed reducer 406 is disposed there in such a manner that its wave generator 406a is integrally fixed to the pulley 404.

The output of the electric motor 402 is transmitted to the harmonic-drive speed reducer wave generator 406a (the speed reducer input), through a belt 408 and the pulley 404, to rotate the same. The harmonic-drive speed reducer 406 reduces the input motor rotation by a predetermined gear ratio through a flex spline 406b and circular splint 406c (speed reducer output), to increase or strengthen the torque of the motor output.

In the configuration, the flex spline 406b is fixed to the first link 400, while the circular spline 406c is fixed to a second link 410 which is also made of iron or a similar material. The second link 410 is displaced relative to the first link 400 by the reduced angular velocity but increased torque of the electric motor 402. The angular displacement of the electric motor 402 is detected by a rotary encoder 414.

Figure 6:
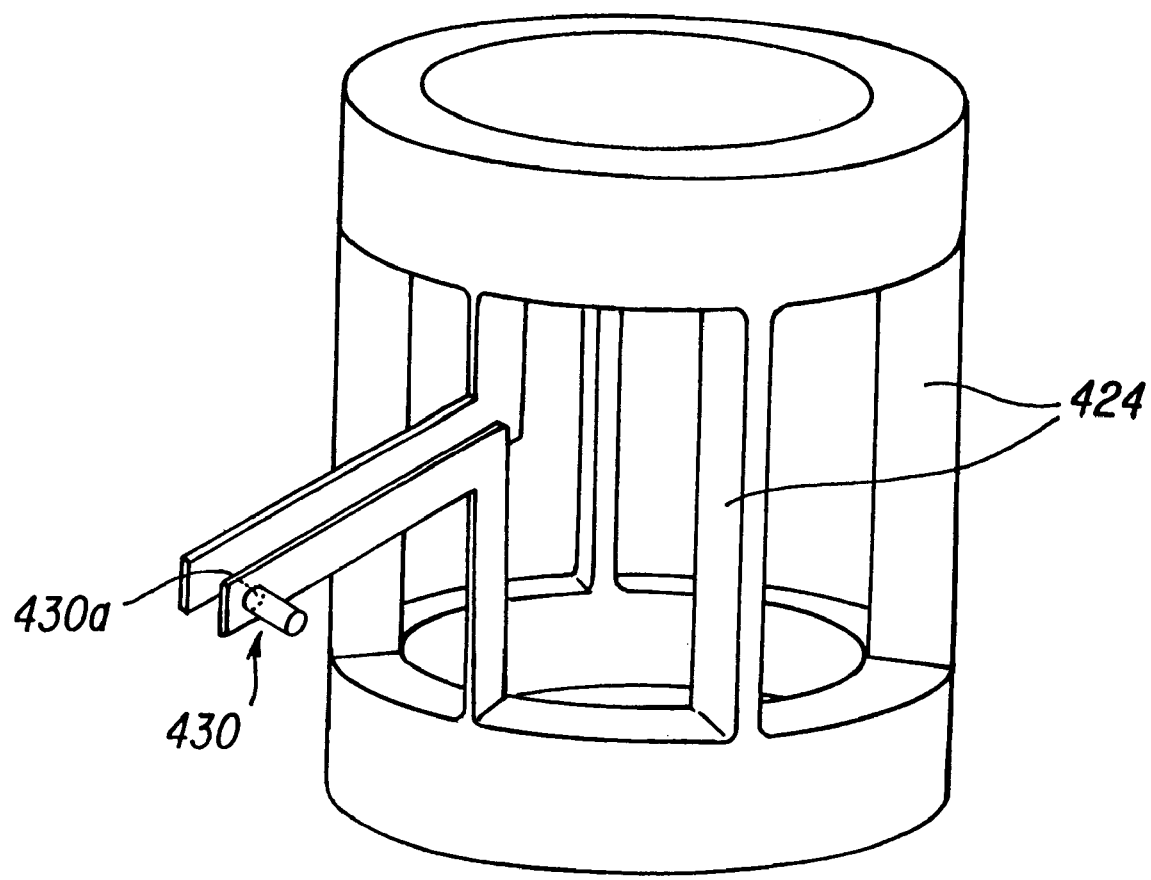
FIG. 6 is an explanatory view diagrammatically illustrating a plurality of post-like members constituting a part of the joint torque system according to the present invention.

The second link 410 has a post 420 affixed by screws 416, 418. In addition, a plurality of post-like members 424 are disposed between the circular spline 406c (speed reducer output) and the second link 410 to connect the same. More specifically, six post-like members 424 are disposed around an axis 426 of the joint (connecting the first and second links 400, 410). Each of the six post-like members 424 are made relatively narrow such that it deforms or twists under a force (torque). The post-like members are disposed annularly in a cup-shaped assembly and are kept apart each other by a predetermined uniform distance, as illustrate in FIGS. 3 and 6. As is shown in FIG. 4, the post-like members 424 embrace or encircle most of the harmonic-drive speed reducer 406.

A gap sensor 430 is housed in the recess of the post 420. The gap sensor 430 has a sensor head 430a (shown in FIGS. 3 and 7) made of a coil. Specifically, the gap sensor 430 is disposed in the recess of the post 420 close to a stay 428 attached to the end of the circular spline 406c. More specifically, the sensor head 430a is disposed in the recess of the post 420 such that the sensor head 430a is close to an end 428a of the stay 428 (which is fixed to the circular link 406c). The gap sensor 430 is a non-contact displacement detector which operates on an eddy-current principle.

With the arrangement, when an external force (torque) is imparted on the second link 410, the post-Like members 424 deform or twist. As a result, the second link 410 displaces about the joint axis 426 (corresponding to the speed reducer input) relative to the first link 400 in response to the exerted force (torque) by an amount in the region of several millimeters. The sensor head 430a of the gap sensor 430 generates a signal indicative of the relative displacement of the circular spline 406c and the second link 410. The external force or torque exerted on the second link 410 can thus be detected.

Figure 7:
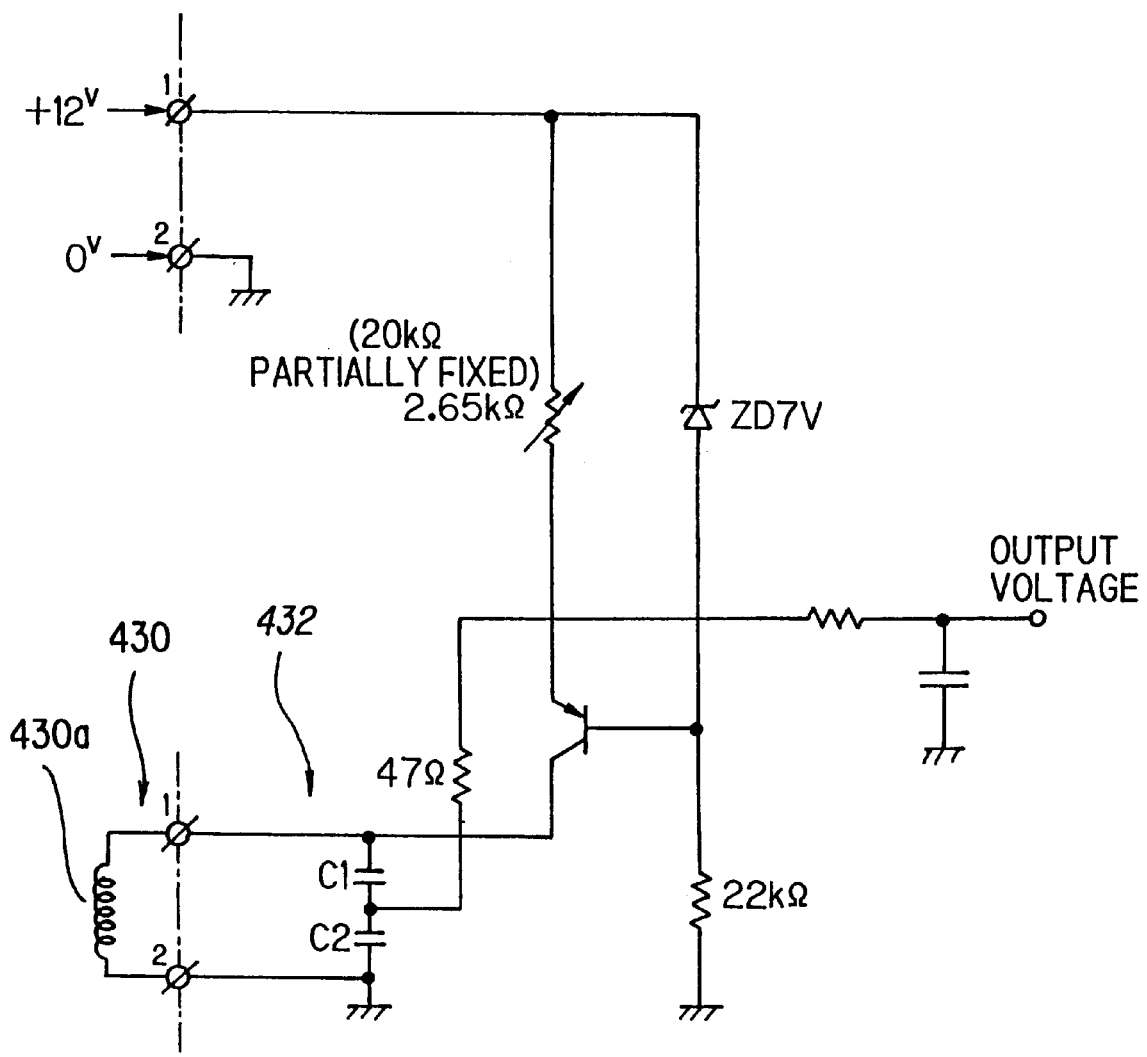
FIG. 7 is a circuit diagram showing a detection circuit of the joint torque detection system according to the present invention.

More specifically, as illustrated in FIG. 7, the change in the inductance developed in the coil of the sensor head 430a results in a change of the amplitude of oscillation which is smoothed by the linear smoothing filter in a detection circuit 432 to generate an output voltage indicative of the force or torque imparted. FIG. 8 shows the characteristics of the gap sensor output voltage [mV] relative to the exerted force (torque). The gap sensor 430 and the detection circuit shown in FIG. 7 are well-known and hence will not be described further here.

The CPU 80 in the control unit 50 detects the force (torque) from the output of the detection circuit 432 and controls the motion of the robot 1 to, for example, pick up a working object (not shown). In FIG. 4, reference numerals 433, 434, 435, 436, 438 represent bearings.

It should be noted that only the first joint of the second finger link mechanism 442R(L) has been described in detail, the configuration of the other joints of the second finger link mechanism 442R(L) as well as the first finger link mechanism 441R(L) are similar to the first joint of the mechanism 442R(L).

Thus, the joint torque detection system according to the embodiment is configured such that six post-like members 424 (constituting a main parts of the system) are disposed to connect the circular spline 406c of the harmonic-drive speed reducer 406 and the second link 410, and are disposed within the joint axis to embrace or encircle the flex spline 406b. The post-like members 424 are arranged not to project outwardly or laterally from the joint axis, in other words they do not project in the direction of joint link width. This arrangement can prevent the size of the joint from being enlarged.

Since the gap sensor head 430a is attached to the post 420 which is fixed to the second link 410, the sensor 430 can directly detect a force imparted on the second link as a twisting moment (torque). More precisely, the force transmission in the embodiment has no play or backlash and the sensor output characteristics have little blind zone when a force acts on the link to move it in a direction relative to the other link. The characteristics are almost linear, thereby enhancing the detection accuracy.

Furthermore, the reliability and the service life of the sensor 430 is improved compared to the case where a strain gauge is affixed. In addition, since the sensor's generated oscillation is smoothed, the sensor exhibits an excellent anti-noise capability. Since the force acting on the joint is in a direction perpendicular to the joint axis, it is born by the bearings, and hence the force does not interfere with the torque detection.

In the embodiment, there is thus provided a joint torque detection system for detecting a torque imparted on a joint having at least a first link 400 and a second link 410 connected to each other to be displaceable about an axis 426, comprising an actuator (electric motor 402) fixed to the first link 400 which outputs a rotation, a plurality of post-like members 424 disposed around the axis 426 between the first link 400 and the second link 410, to be deformable when a torque is imparted on one of the first and second links, and a sensor (gap sensor 430) disposed at one of the first and the second links, more specifically to the post 420 fixed to the second link 410 close to the other, to generate a signal indicative of a relative displacement between the first and second links.

More specifically, the system includes a speed reducer (harmonic-drive speed reducer 406) fixed to the second link 410 having an input (wave generator 406a) to receive the rotation of the actuator and to reduce its speed, and an output (circular spline 406c) to output the reduced rotation such that the second link displaces relative to the first link, and said plurality of post-like members are fixed between the output of said speed reducer through the stay 428 and the second link 410. The speed reducer 406 is positioned at the axis 426 such that the post-like members 424 embrace the speed reducer. The plurality of post-like members 424 are annularly disposed around the axis 426, and are equally spaced apart by a predetermined distance from each other.

It should be noted in the above that, although the sensor 430 is fixed to the second link 420, it can instead be fixed to the circular spline 406c (i.e., the first link. 400).

It should also be noted in the above that, although the sensor utilizing eddy-current is used as a displacement detector, any other sensors such as one utilizing electrostatic capacity can instead by used. Although the displacement is detected by the deformation, it can instead be detected by distortion or similar parameters.

It should also be noted that, although the harmonic-drive speed reducer is used, any other speed reducers such as one having a planetary gear mechanism can alternatively be used.

It should further be noted that, although the present invention is described with reference to a legged mobile robot, the present invention should not be limited to this mobile robot. Rather, the present invention will be applied not only to other type of robots including stationary industrial ones, but also to any joints having a rotational axis.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. A joint torque detecting system for detecting a torque imparted to a joint having at least a first link and a second link connected to each other by a joint axis to be angularly displaceable about the axis, comprising:

an actuator fixed to the first link which outputs a rotation;

a plurality of piling members connected to the second link and fixed around the axis connecting the first link and the second link, to be deformable when a torque is imparted on one of the first and second links; and a sensor disposed at one of the first and second links close to the other to generate a signal indicative of a relative displacement between the first and second links.

2. A system according to claim 1, further including:

a speed reducer fixed to the second link having an input to receive the rotation of the actuator to reduce its speed and an output to output the reduced rotation such that the second link displaces relative to the first link, and said plurality of piling members are fixed between the output of said speed reducer and the second link.

3. A system according to claim 2, wherein said speed reducer is positioned at the axis such that the piling members embrace the speed reducer.

4. A system according to claim 1, wherein said plurality of piling members are annularly disposed around the axis.

5. A system according to claim 4, wherein said plurality of piling member are equally spaced apart by a predetermined distance from each other.

* * * * *